(12) United States Patent
Hayashi (10) Patent No.: US 12,482,839 B2
(45) Date of Patent: Nov. 25, 2025

(54) FUEL CELL UNIT (71) Applicant: TOYOTA JIDOSHA KABUSHIKI KAISHA, Toyota (JP)

(72) Inventor: Atsushi Hayashi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 545 days.

(21) Appl. No.: 17/965,033

(22) Filed: Oct. 13, 2022

(65) Prior Publication Data

US 2023/0127242 A1 Apr. 27, 2023

(30) Foreign Application Priority Data

Oct. 26, 2021 (JP) .................. 2021-175017

(51) Int. Cl.
H01M 8/04537 (2016.01)
H01M 8/0267 (2016.01)
H01M 8/04858 (2016.01)
H01M 8/2475 (2016.01)

(52) U.S. Cl.
CPC ..... *H01M 8/04619* (2013.01); *H01M 8/0267* (2013.01); *H01M 8/0494* (2013.01); *H01M 8/2475* (2013.01)

(58) Field of Classification Search
CPC .......... H01M 8/04619; H01M 8/0267; H01M 8/0494; H01M 8/2475; H01M 8/04; H01M 8/04029; H01M 2250/20

USPC ........................................ 423/433
See application file for complete search history.

(56) References Cited

U.S. PATENT DOCUMENTS

| | | | |
|---|---|---|---|
| 10,205,316 B1* | 2/2019 | Jojima | B60L 58/10 |
| 2013/0045398 A1* | 2/2013 | Katano | B60L 50/72 |
| | | | 429/7 |
| 2017/0253126 A1* | 9/2017 | Katano | B60L 50/72 |
| 2018/0054151 A1* | 2/2018 | Matsumoto | H01M 8/04589 |
| 2019/0103806 A1* | 4/2019 | Miyake | H02M 3/1584 |
| 2021/0111419 A1 | 4/2021 | Itou | |
| 2021/0249673 A1 | 8/2021 | Hayashi et al. | |

FOREIGN PATENT DOCUMENTS

| | | |
|---|---|---|
| CN | 112737320 A | 4/2021 |
| JP | 2014-182925 A | 9/2014 |
| JP | 2021-026958 A | 2/2021 |
| JP | 2021-128847 A | 9/2021 |

* cited by examiner

*Primary Examiner* — Christian Roldan
(74) *Attorney, Agent, or Firm* — Dinsmore & Shohl LLP (57) ABSTRACT The fuel cell unit comprises a fuel cell stack, a power converter configured to convert the power of the fuel cell stack, and a case configured to accommodate the fuel cell stack and the power converter in the same space. The power converter is configured to be disposed below the fuel cell stack.

4 Claims, 7 Drawing Sheets

FUEL CELL UNIT

CROSS-REFERENCE TO RELATED APPLICATION

This application claims priority to Japanese Patent Application No. 2021-175017 filed on Oct. 26, 2021, incorporated herein by reference in its entirety.

BACKGROUND

1. Technical Field

The present disclosure relates to a fuel cell unit.

2. Description of Related Art

Japanese Unexamined Patent Application Publication No. 2021-128847 (JP 2021-128847 A) discloses a fuel cell unit in which a power converter is disposed above a fuel cell stack and the fuel cell stack and the power converter are housed in a case in the same space.

SUMMARY

During operation of the fuel cell unit under a high load condition, the temperature of the power converter becomes higher than that of the fuel cell stack. There is room for improvement because, when the power converter is disposed above the fuel cell stack, the heat emitted from the power converter stays in the vicinity of the power converter, and the temperature of the power converter is likely to be higher than the heat resistance upper limit temperature of the power converter.

The present disclosure provides a fuel cell unit.

The fuel cell unit according to a first aspect of the present disclosure includes a fuel cell stack, a power converter configured to convert power of the fuel cell stack, and a case configured to house the fuel cell stack and the power converter in the same space. Here, the power converter is configured to be disposed below the fuel cell stack.

According to such a configuration, since the heat generated in the power converter escapes upward, it is possible to suppress the temperature of the power converter housed in the case in the same space as the fuel cell stack from becoming higher than the heat resistance upper limit temperature of the power converter.

The fuel cell unit according to the first aspect may further include a plurality of reactors. Here, the reactors may be configured to be provided in the power converter. The reactors may be configured to be arranged side by side along a flow direction of a coolant for cooling the fuel cell stack, and among the reactors, a reactor on an upstream side in the flow direction of the coolant may be configured to be driven more preferentially than a reactor on a downstream side in the flow direction of the coolant.

According to such a configuration, due to the heat of the reactors provided in the power converter, it is possible to suppress an increase in the temperature of the fuel cell stack.

The fuel cell unit according to the first aspect of the present disclosure allows the heat generated in the power converter to escape upward, and can suppress the temperature of the power converter housed in the case in the same space as the fuel cell stack from becoming higher than the heat resistance upper limit temperature of the power converter.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiments of the fuel cell unit according to the present disclosure will be described below. This embodiment is not intended to limit the present disclosure.

Figure 1:
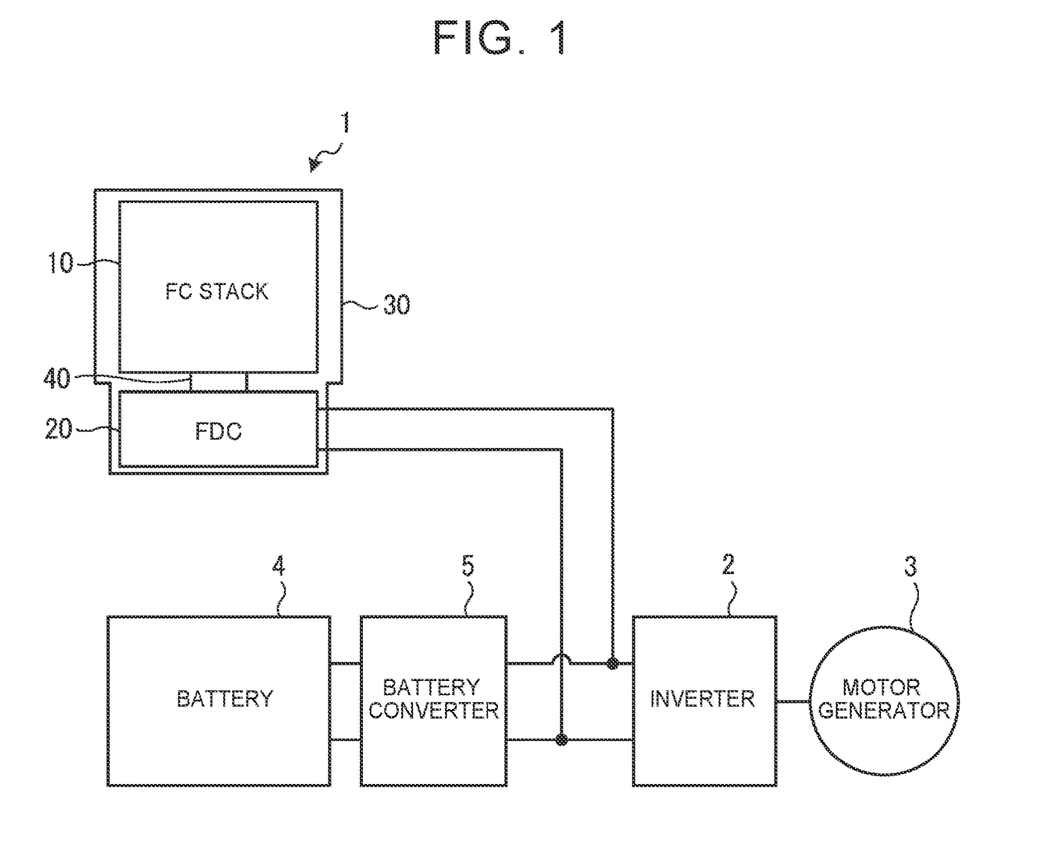
FIG. 1 is a schematic diagram showing a power train system of a fuel cell electric vehicle having a fuel cell unit according to an embodiment.

FIG. 1 is a schematic diagram showing a power train system of a fuel cell electric vehicle having a fuel cell unit 1 according to the embodiment. The fuel cell electric vehicle according to the embodiment includes a fuel cell unit 1, an inverter 2, a motor generator 3, a battery 4, and various components such as a battery converter 5, and an ECU which is a control device for controlling the various components.

The fuel cell unit 1 is configured to include a Fuel Cell (FC) stack 10, a FDC 20, a case 30, and a conductive member 40 and the like.

The FC stack (fuel cell stack) 10 is a power generation device having a stack structure in which a plurality of cells are stacked in series. The cell comprises a membrane electrode assembly as a generator. The power generator generates electric power by an electrochemical reaction between a fuel gas and an oxidizing gas. Incidentally, the fuel cell system includes various devices for causing the FC stack 10 to function as a power generation device. Various devices include fuel gas feeders, oxidizing gas feeders, cooling devices, and the like. The illustration and description of the various devices are omitted.

FDC (FC step-up converter) 20 is a DC-DC converter for fuel cells (FC). FDC 20 is a power converter that boosts the output voltage of the FC-stack 10 to a high voltage available in the motor generator 3.

The case 30 is a housing member for housing the FC stack 10 and FDC 20. The case 30 is made of, for example, a metal such as an aluminum alloy in a box shape. In the case 30, the partition wall for separating the FC-stack 10 and FDC 20 is not provided. That is, in the case 30, the FC-stack 10 and FDC 20 are arranged in the same space.

Conducting member 40, for example, is constituted by a bus bar for electrically connecting the FC-stack 10 and FDC 20.

Inverter 2 converts the DC power supplied from FDC 20 to AC power, a drive circuit for supplying to the motor generator 3. The motor generator 3 drives the wheels by receiving AC power from the inverter 2. Incidentally, the inverter 2 supplies the AC power of the phase number corresponding to the type of the motor used in the motor generator 3 to the motor generator 3. For example, if the motor generator 3 is a synchronous motor comprising a three-phase coil, the inverter 2 supplies three-phase AC power to the motor generator 3.

The battery converter 5 step down the voltage boosted by FDC 20 or the voltage of the regenerative power generated by the motor generator 3 at the time of vehicle braking. Then, the battery converter 5 supplies the voltage obtained by step-down to the battery 4. The battery converter 5 boosts the voltage of the DC power from the battery 4, or supplied to the inverter 2. Battery converter 5 is a bi-directional DC-DC converter.

The battery 4 is capable of storing electric power generated by the FC stack 10 and regenerative electric power generated by the motor generator 3 at the time of vehicle braking. The battery 4 functions as a power supply for supplying power to the motor generator 3 or the like. The battery 4 of the present embodiment is a chargeable and dischargeable secondary battery, for example, it is possible to use a lithium ion battery or a nickel metal hydride battery. As the battery 4 may be a chargeable and dischargeable power storage device other than the secondary battery, for example, it is possible to use a capacitor.

Figure 2:
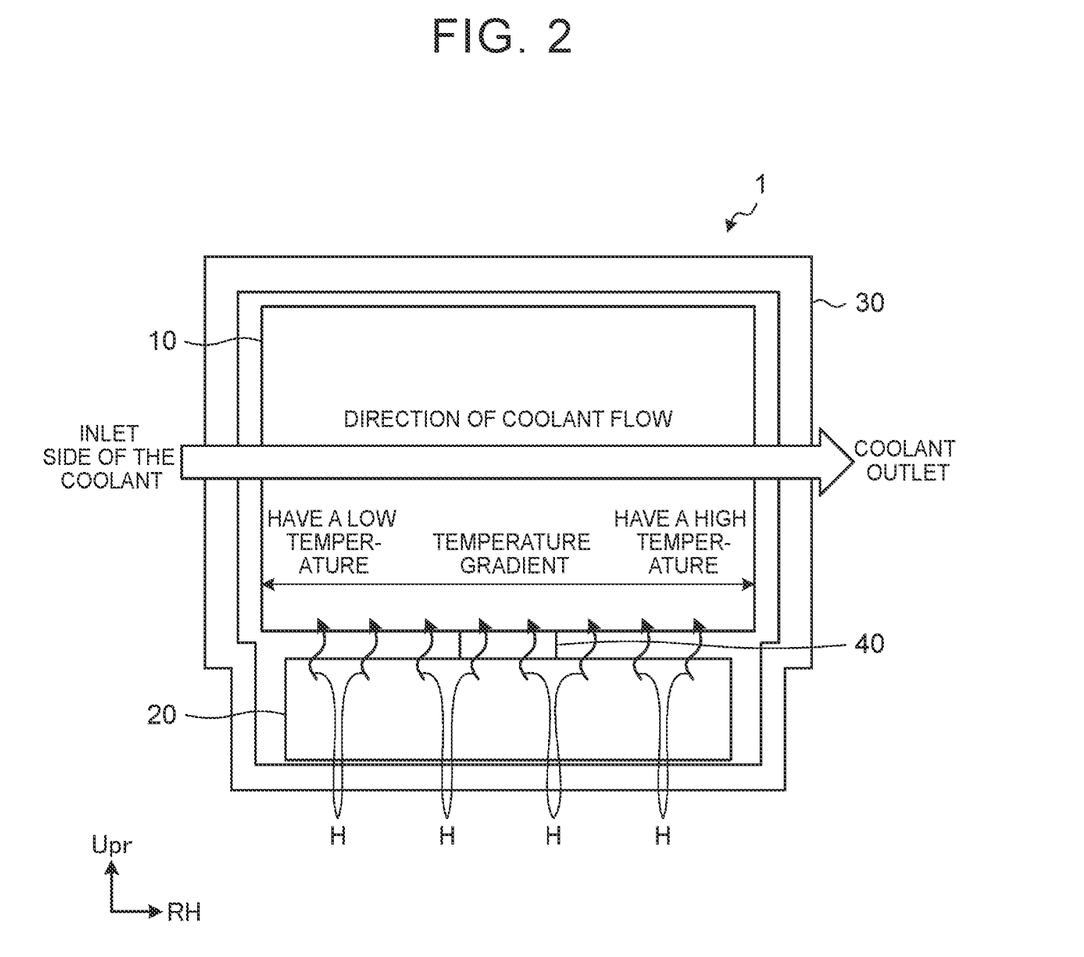
FIG. 2 is a diagram showing the arrangement of FC stacks and FDCs in a fuel cell unit.

FIG. 2 is a diagram illustrating the arrangement of the FC-stack 10 and FDC 20 in the fuel cell unit 1. Note that "RH" in FIG. 2 indicates the right side of the vehicle. In FIG. 2, "Upr" indicates the upper side of the vehicle. As shown in FIG. 2, in the fuel cell unit 1 according to the embodiment, the FC stack 10 and FDC 20 are accommodated in the same case 30. FDC 20 is disposed below the FC stack 10.

Figure 3:
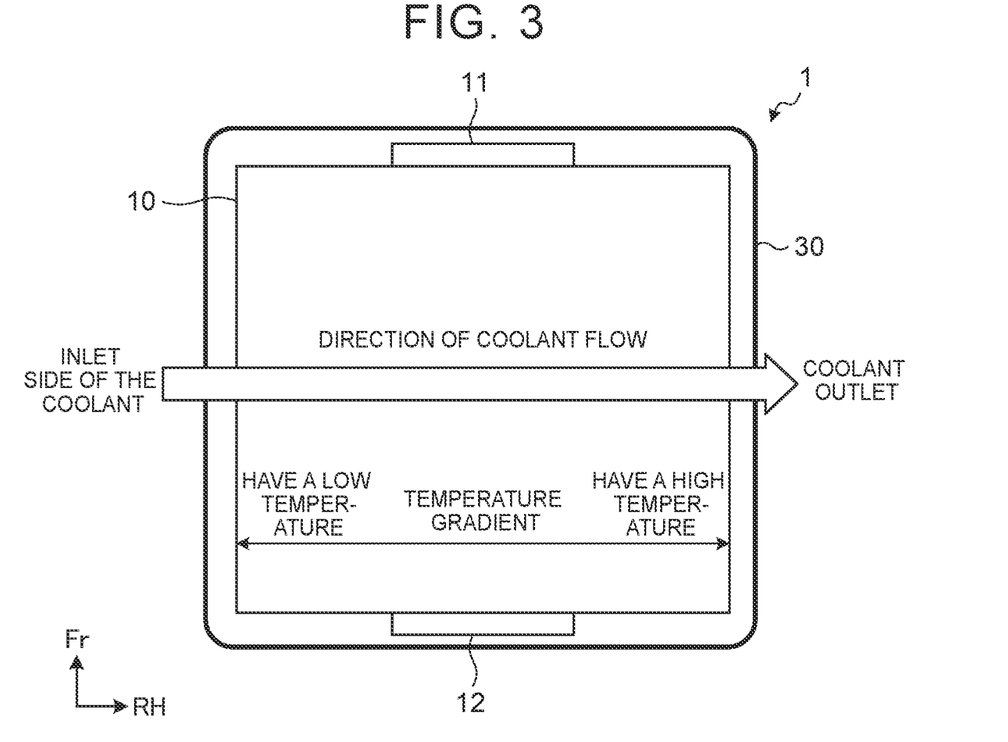
FIG. 3 is a top view of the FC stack.

FIG. 3 is a top view of the FC stack 10. Note that "Fr" in FIG. 3 indicates the front side of the vehicle. As shown in FIG. 3, both end portions in the vehicle front-rear direction of the FC stack 10, P terminal 11 and N terminal 12 is provided. The P terminal 11 and the N terminal 12 are terminals for extracting electricity generated by the fuel cell reaction of each cell included in the FC stack 10.

Figure 4:
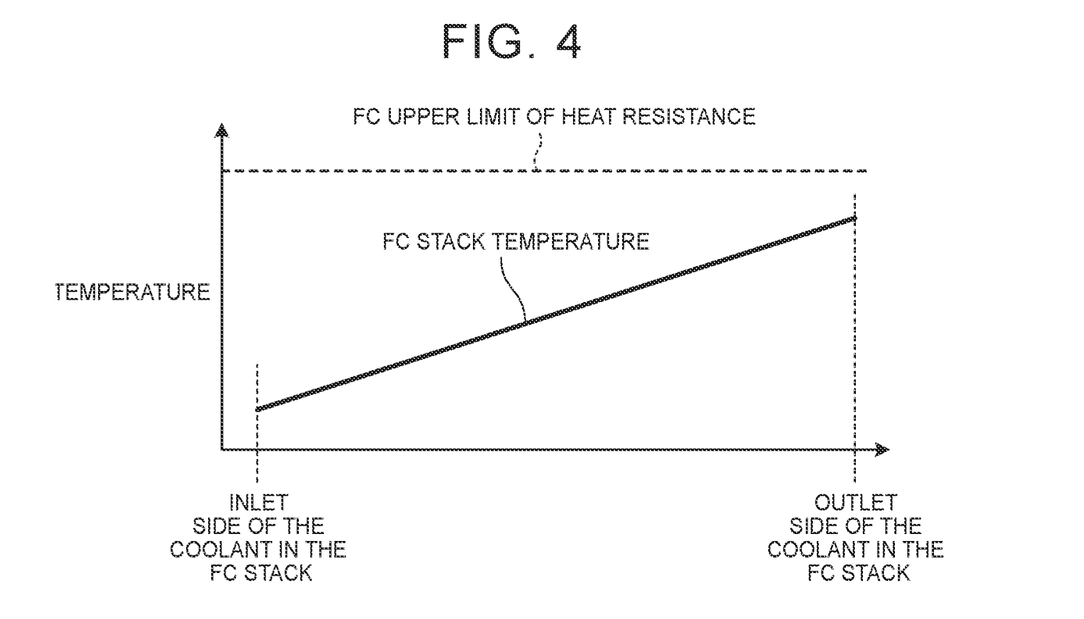
FIG. 4 is a graph showing an example of the temperature gradient of the FC stack.

The FC stack 10 includes an internal coolant flow passage of the FC stack 10. Then, each cell is cooled by flowing the cooling liquid by a liquid cooling device equipped with a radiator or a pump or the like. That is, the FC stack 10 is a liquid-cooled type. Further, as shown in FIGS. 2 and 3, the flow direction of the cooling liquid in the FC stack 10 has a one direction toward the vehicle right side from the vehicle left side of the FC stack 10. An inlet of the cooling liquid is provided on the vehicle left side of the FC stack 10, and an outlet of the cooling liquid is provided on the vehicle right side of the FC stack 10. The coolant flowing through the FC stack 10 is heated as it cools each cell of the FC stack 10. Therefore, in the flow direction of the cooling liquid, the temperature of the cooling liquid increases toward the outlet side (downstream side) from the inlet side (upstream side). Therefore, in the flow direction of the cooling liquid, the FC stack 10 is cooled by the cooling liquid having a higher liquid temperature at the outlet side than at the inlet side. Therefore, in the FC stack 10, as shown in FIG. 4, in the flow direction of the cooling liquid, a temperature gradient such that the temperature increases toward the outlet side (from the left side of the vehicle to the right side of the vehicle) from the inlet side occurs. In the FC stack 10, the upper limit temperature for establishing the power generation performance and durability is determined. The flow rate of the cooling liquid is controlled by the liquid cooling device so that the temperature near the outlet side in the flow direction of the cooling liquid does not exceed the upper limit temperature.

Figure 5:
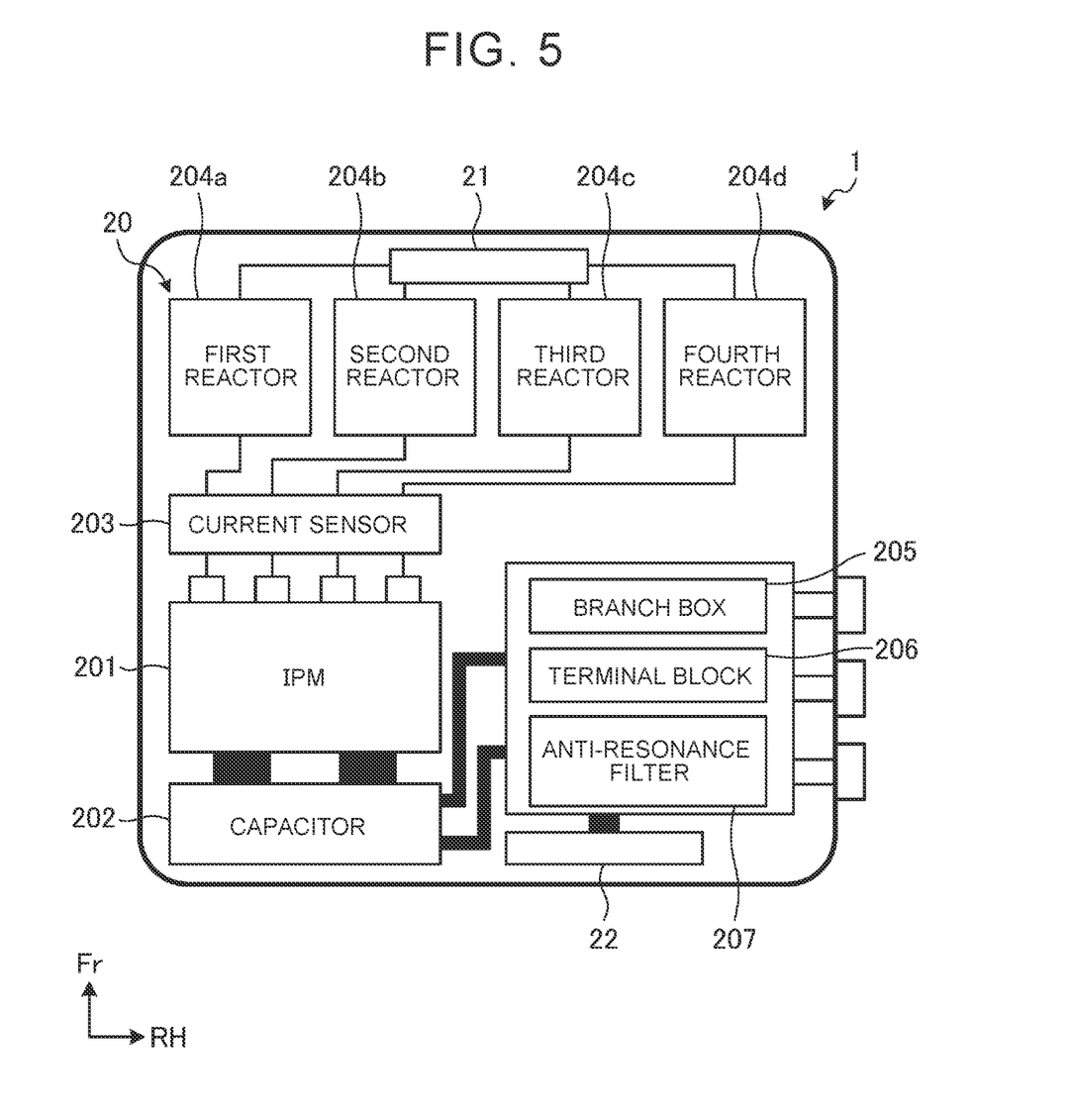
FIG. 5 is a top view of the FDC.

FIG. 5 is a top view of FDC 20. As shown in FIG. 5, FDC 20 is a multiphase boost converter, and includes at least a P terminal 21, an N terminal 22, an IPM 201, a capacitor 202, a current sensor 203, a first reactor 204a, a second reactor 204b, a third reactor 204c, a fourth reactor 204d, a branch box 205, a terminal block 206, and a resonance prevention filter 207. In the following description, when the first reactor 204a, the second reactor 204b, the third reactor 204c, and the fourth reactor 204d are not particularly distinguished from each other, they are simply referred to as reactors 204. The number of reactors 204 provided in FDC 20 is not limited to four, and a plurality of reactors 204 can be provided.

The reactor 204 is disposed on the front side of FDC 20. The first reactor 204a, the second reactor 204b, the third reactor 204c, and the fourth reactor 204d are arranged side by side along the flow direction of the coolant in the FC stack 10. The first reactor 204a, the second reactor 204b, the third reactor 204c, and the fourth reactor 204d are arranged in the order of the first reactor 204a, the second reactor 204b, the third reactor 204c, and the fourth reactor 204d from the inlet side (the left side of the vehicle) toward the outlet side (the right side of the vehicle) in the flow direction of the coolant in the FC stack 10.

P terminal 21 and N terminal 22 is a terminal for electrically connecting FDC 20 to the FC-stack 10. Specifically, the P terminal 11 of the P terminal 21 and the FC stack 10 is electrically connected, and the N terminal 12 of the N terminal 47 and the FC stack 10 is electrically connected.

Four reactors 204 are connected in parallel to the P terminal 21 by using a bus bar. The four reactors 204 are connected in parallel to IPM 201 by a bus bar. Each bus bar connecting the four reactors 204 and IPM 201, the current sensor 203 is attached. IPM 201 is arranged side by side with the current sensor 203 in a direction perpendicular to the flow direction of the coolant in the FC-stack 10. A smoothing capacitor 202 is connected to the output side of IPM 201 by a bus bar. In FDC 20, IPM 201 and the capacitor 202 and the current sensor 203 are positioned upstream of the center of the coolant flow in the FC-stack 10 in a top view of FDC 20. Further, IPM 201, the capacitor 202 and the current sensor 203, in a top view of FDC 20, are arranged side by side in a direction perpendicular to the flow direction of the coolant.

The capacitor 202, the branch box 205, the terminal block 206, and N terminal 22 is connected via a resonance prevention filter 207 or the like. Branch box 205, the terminal block 206, and the resonance prevention filter 207 is disposed downstream of the flow direction of the coolant with respect to IPM 201 and the capacitor 202. Branch box 205, the terminal block 206, and a resonance prevention filter 207, the connection between the capacitor 202, a bus bar is used. Further, the branch box 205, the terminal block 206, and a resonance prevention filter 207, the bus bar is also used for connection between the N terminal 22. Further, the branch box 205, the terminal block 206, and, the resonance prevention filter 207, such as an output terminal for a battery 4 provided on the outside of the case 30 is connected.

Figure 6:
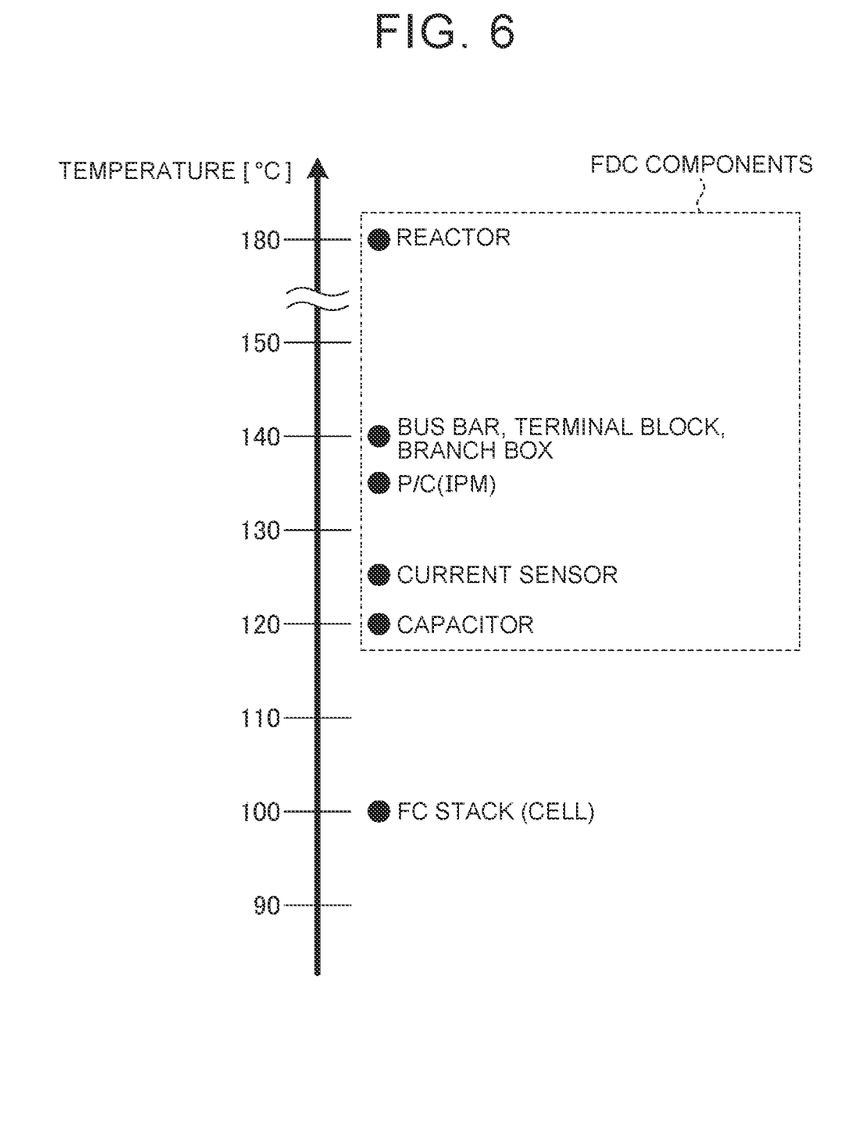
FIG. 6 is a diagram showing an example of the heat resistance upper limit temperature of the cells and FDC components of the FC stack.

FIG. 6 is a diagram showing an example of the heat resistance upper limit temperature of the cell and FDC components of the FC stack 10. As shown in FIG. 6, the heat resistance upper limit temperature of the cells of the FC stack 10 is generally set to about 100 [° C.]. On the other hand, the heat resistance upper limit temperature of the components constituting FDC 20 (FDC component) is both higher than the heat resistance upper limit temperature of the cell of the FC stack 10. In particular, the heat resistance upper limit temperature of the reactor 204, and the heat resistance upper limit temperature of the cell of the FC stack 10, there is a deviation of about 80 [° C.].

Here, during operation of the fuel cell unit 1 under high loading conditions, the temperature of FDC 20 is higher than the temperature of the FC-stack 10. Therefore, for example, in the case 30 of the fuel cell unit 1, when placing FDC20 above the FC stack 10, the heat emitted from FDC 20 stays near the upper or FDC 20 in the case 30. Consequently, the temperature of FDC 20 becomes higher than the heat resistance upper limit temperature of FDC 20 (heat resistance upper limit temperature of the FDC component).

On the other hand, in the case 30 as in the fuel cell unit 1 according to the embodiment, when placing FDC 20 below the FC stack 10, as shown by the arrow H in FIG. 2, it is possible to release the heat of FDC 20 to the space above FDC 20 in the case 30. Thus, in the fuel cell unit 1 according to the embodiment, the heat generated by FDC 20 can be released upward, the heat released from FDC 20 is hardly accumulated in the vicinity of FDC 20. Therefore, the temperature of FDC 20 accommodated in the case 30 in the same space as the FC stack 10, it is possible to suppress the heat resistance upper limit temperature of FDC 20 (heat resistance upper limit temperature of the FDC component) becomes higher.

Figure 7:
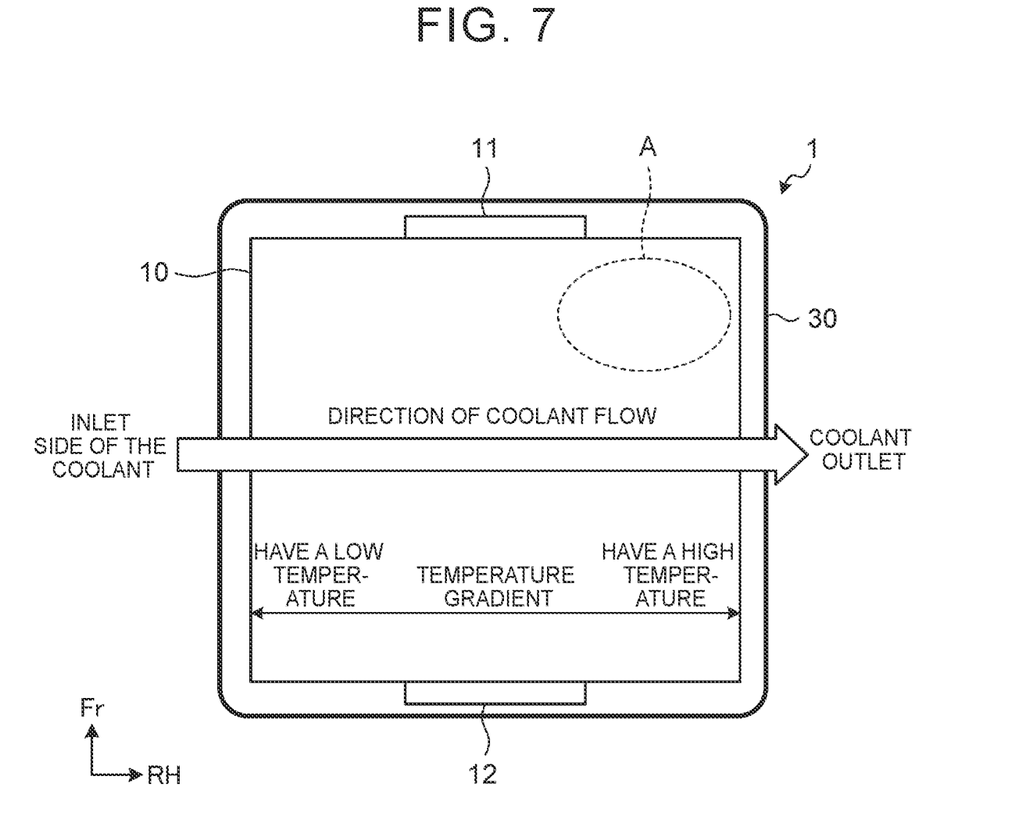
FIG. 7 is a diagram showing a region A which is a portion of the cell located at the outlet side in the coolant flow direction at the vehicle front side of the FC stack.

At this time, the FC stack 10 disposed above FDC 20 in the case 30 receives heat emitted upward from FDC 20. Specifically, the heat emitted by the reactor 204 is received by a portion of the cells of the FC stack 10 disposed directly above the reactor 204. Then, in the vehicle front side of the FC stack 10, which is indicated by a region A surrounded by a broken line circle in FIG. 7, the temperature of the portion of the cell located at the outlet side in the flow direction of the cooling liquid is higher than the temperature of the portion of the cell located at the inlet side in the flow direction of the cooling liquid. Therefore, the heat from the reactor 204, the temperature of the cells of the FC stack 10, when it exceeds the heat resistance upper limit temperature of the cell, there is a possibility that lead to a decrease or early deterioration of the power generation capacity of the FC stack 10.

In contrast, in the fuel cell unit 1 according to the embodiment, by adjusting the temperature and the flow rate of the cooling liquid for cooling the cells of the FC stack 10 by the liquid cooling device, the temperature of the cells of the FC stack 10, the heat resistance upper limit temperature of the cell it is possible to suppress exceeding.

Figure 8A:
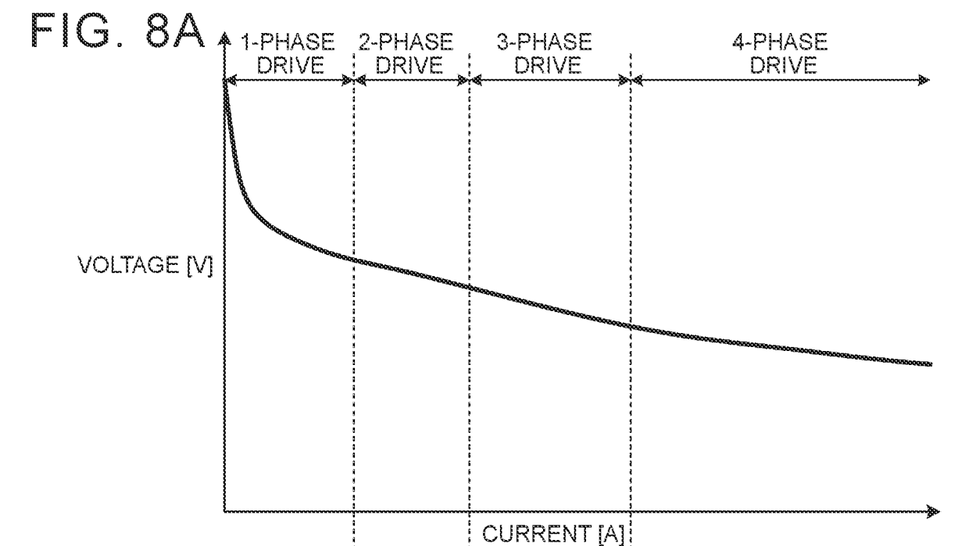
FIG. 8A is a graph showing the relation between the output current and the output voltage of the FC-stack.
Figure 8B:
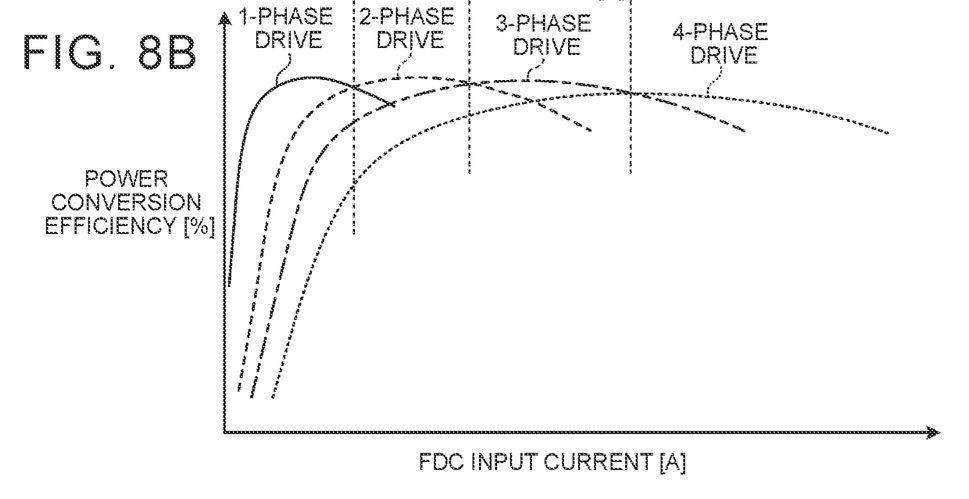
FIG. 8B is a graph showing the relation between the input current of the FDC and the power conversion efficiency.

FIG. 8A is a graph showing the relation between the output current and the output voltage of the FC-stack 10. FIG. 8B is a graph showing the relation between the input current of FDC 20 and the power conversion efficiency.

In the fuel cell unit 1 according to the embodiment, FDC 20, there is an optimum reactor driving phase count corresponding to the input current of FDC 20 (reactor 204). Corresponding to the input current of FDC 20, the number of reactors 204 to be driven is appropriately changed. If the input current of FDC 20 is small, to reduce the number of reactor drive phases, so as to increase the number of reactor drive phases when the input current of FDC 20 is large, the control of driving selects the reactor 204 is performed. Such control is performed, for example, by a control device such as an ECU provided in the fuel cell electric vehicle. Further, when selecting the reactor 204 to be driven, of the four reactors 204, the reactor 204 of the inlet side (upstream side) in the flow direction of the cooling liquid in the FC stack 10, the outlet side in the flow direction of the cooling liquid (downstream side) to drive preferentially selected than the reactor 204. In other words, among the four reactors 204, the reactor 204 where the temperature of the FC stack 10 is disposed below the lower side, the temperature of the FC stack 10 is disposed below the higher side to drive preferentially than the reactor 204.

More specifically, as shown in FIG. 8A and FIG. 8B, the first reactor 204a is driven within a range in which the input current of FDC 20 is one-phase driving. In addition, the first reactor 204a and the second reactor 204b are driven when the input current of FDC 20 is two-phase driving. In addition, the first reactor 204a, the second reactor 204b, and the third reactor 204c are driven when the input current of FDC 20 is three-phase driving. In addition, the first reactor 204a, the second reactor 204b, the third reactor 204c, and the fourth reactor 204d are driven when the input current of FDC 20 is four-phase driving.

Thus, in the fuel cell unit 1 according to the embodiment, while suppressing an increase in the flow rate of the cooling liquid flowing through the FC stack 10, it is possible to suppress an excessive increase in the temperature of the FC stack 10 due to heat reception from FDC 20.

What is claimed is:

1. A fuel cell unit comprising:
   a fuel cell stack;
   a power converter configured to convert power of the fuel cell stack, the power converter comprising at least a P terminal, an N terminal, an IPM, a capacitor, a current sensor, a branch box, a terminal block, and a resonance prevention filter;
   a case, the fuel cell stack and the power converter being housed in a same space of the case with the power converter disposed directly below the fuel cell stack; and
   a plurality of reactors provided in the power converter, the reactors arranged side by side along a flow direction of a coolant for cooling the fuel cell stack, the plurality of reactors comprising a first reactor, a second reactor, a third reactor, and a fourth reactor,
   wherein among the plurality of reactors, a reactor on an upstream side in the flow direction of the coolant is configured to be driven more than a reactor on a downstream side in the flow direction of the coolant; and
   wherein the plurality of reactors are connected in parallel to the P terminal by a first bus bar, and the capacitor is connected to the N terminal via the branch box, the terminal block, and the resonance prevention filter by a second bus bar.

2. The fuel cell unit of claim 1, wherein the branch box, the terminal block, and the resonance prevention filter are disposed downstream of the flow direction of the coolant with respect to the IPM and the capacitor.

3. The fuel cell unit of claim 1, wherein the first reactor is driven in a case in which the input current of the power converter is one phase driving, wherein the first reactor and the second reactor are driven in a case in which the input current of the power converter is two-phase driving, wherein the first reactor, the second reactor, and the third reactor are driven in a case in which the input current of the power converter is three-phase driving, and wherein the first reactor, the second reactor, the third reactor, and the fourth reactor are driven in a case in which the input current of the power convertor is four-phase driving.

4. A fuel cell unit comprising:
   a fuel cell stack;
   a power converter configured to convert power of the fuel cell stack, the power converter comprising at least a P terminal, an N terminal, an IPM, a capacitor, a current sensor, a branch box, a terminal block, and a resonance prevention filter;
   a case, the fuel cell stack and the power converter being housed in a same space of the case with the power converter disposed directly below the fuel cell stack; and
   a plurality of reactors provided in the power converter, the reactors arranged side by side along a flow direction of a coolant for cooling the fuel cell stack, the plurality of reactors comprising a first reactor, a second reactor, a third reactor, and a fourth reactor,
   wherein among the plurality of reactors, a reactor on an upstream side in the flow direction of the coolant is configured to be driven more than a reactor on a downstream side in the flow direction of the coolant; and
   wherein the branch box, the terminal block, and the resonance prevention filter are disposed downstream of the flow direction of the coolant with respect to the IPM and the capacitor.

* * * * *